United States Patent

Yano et al.

[11] Patent Number: 5,905,848
[45] Date of Patent: *May 18, 1999

[54] IMAGE PICKUP APPARATUS WITH VIBRATION COMPENSATION

[75] Inventors: Kotaro Yano; Tsunefumi Tanaka, both of Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/614,555

[22] Filed: Mar. 13, 1996

[30] Foreign Application Priority Data

Mar. 15, 1995 [JP] Japan .................................. 7-083273

[51] Int. Cl.[6] ............................ A04N 5/225; A04N 5/228
[52] U.S. Cl. .......................................... 386/117; 348/208
[58] Field of Search .............................. 386/46, 117, 120, 386/107, 118, 38; 358/906, 909.1; 348/207, 208; H04N 5/225, 5/228

[56] References Cited

U.S. PATENT DOCUMENTS

| | | | |
|---|---|---|---|
| 5,117,246 | 5/1992 | Takahashi et al. | 348/208 |
| 5,210,563 | 5/1993 | Hamada et al. | 396/53 |
| 5,264,893 | 11/1993 | Nonaka | 396/104 |
| 5,461,485 | 10/1995 | Nagashima et al. | 358/906 |
| 5,594,928 | 1/1997 | Yamano | 396/95 |

*Primary Examiner*—Robert Chevalier
*Attorney, Agent, or Firm*—Fitzpatrick, Cella, Harper & Scinto

[57] ABSTRACT

An image pickup apparatus includes an image pickup element, a memory for storing a digital signal obtained by converting image information output from the image pickup element by an A/D converter, a displacement detection unit for detecting the position displacement of a camera, and a control unit for controlling the write timing of an image in the memory by predicting a release time at which the position displacement detected by the displacement detection unit falls within a predetermined allowable range.

14 Claims, 5 Drawing Sheets

IMAGE PICKUP APPARATUS WITH VIBRATION COMPENSATION

BACKGROUND OF THE INVENTION

1. Field of the Invention

The present invention relates to an image pickup apparatus and, more particularly, to an image pickup apparatus such as an electronic still camera which electrically records a still image on a recording medium.

2. Related Background Art

Conventionally, an image pickup apparatus such as an electronic still camera which electrically records a still image on a recording medium is known. In recent years, compact, lightweight image pickup apparatuses have been increasingly developed.

However, a conventional compact, lightweight image pickup apparatus has a drawback in that a vibration or camera shake in a photographing operation, easily can occur and in particular, the probability that a vibration is generated is very high at the instance when a photographer depresses the release switch.

SUMMARY OF THE INVENTION

The present invention has been made in consideration of the above-mentioned problems, and has as its object to provide an image pickup apparatus which can easily obtain an image free from any vibration or the like even when the apparatus has a compact, lightweight structure.

In order to achieve the above object, according to a preferred embodiment of the present invention, there is disclosed an image pickup apparatus which comprises image pickup means having at least an image pickup lens for picking up an optical image, and an image pickup element for converting the optical image picked up by the image pickup lens into an electrical signal the apparatus, comprises image information storage means for storing image information obtained by the image pickup means, detection means for detecting a change in position of the image pickup means, prediction means for predicting a release time, at which the change in position of the image pickup means falls within a predetermined allowable range, on the basis of a detection result of the detection means, and for generating an image pickup signal, and writing control means for controlling a writing operation of the image information on the basis of a prediction result of the prediction means.

According to a preferred embodiment of the present invention, there is disclosed an image pickup apparatus which comprises open/close control means for controlling an open/close state of a shutter on the basis of the prediction result of the prediction means in place of the writing control means.

According to a preferred embodiment of the present invention, there is disclosed an image pickup apparatus wherein the detection means is angular velocity detection means for detecting the change in position as a change in angular velocity, and the prediction means comprises displacement state calculation means for calculating a displacement state of the change in position on the basis of the detection result of the detection means, displacement state storage means for storing the displacement state for a predetermined time period, release time prediction means for predicting the release time on the basis of the displacement state, and image pickup signal generation means for generating the image pickup signal on the basis of a prediction result of the release time prediction means.

According to a preferred embodiment of the present invention, there is disclosed an image pickup apparatus which preferably comprises, in place of the detection means, temporary storage means for temporarily storing the image information, feature point extraction means for extracting a peak position as a feature point by differentiating the image information, matching point extraction means for extracting a matching point at the feature point on the basis of a storage result in the temporary storage means and image information picked up by the image pickup means, and motion vector detection means for detecting a motion vector on the basis of an extraction result of the matching point extraction means and the image information picked up by the image pickup means, and comprises, in place of the prediction means, motion vector storage means for storing the motion vector, release time prediction means for predicting the release time on the basis of the motion vector, and image pickup signal generation means for generating the image pickup signal on the basis of a prediction result of the release time prediction means.

According to a preferred embodiment of the present invention, there is disclosed an image pickup apparatus which further comprises a release switch for outputting a release signal, and integration means for integrating the displacement state during an interval from an ON time of the release switch until the release time, and a warning signal is generated when an integrated value of the integration means is larger than a predetermined value, or which further comprises a release switch for outputting a release signal, and a warning signal is generated when a time duration from an ON time of the release switch until the release time is longer than a predetermined time duration.

According to a preferred embodiment of the present invention, there is disclosed an image pickup apparatus which predicts a release time based on the output from the detection means when a change in position (a change in angular velocity or a change in motion vector) falls within a predetermined allowable range, and controls the write operation of the image or the open/close timing of the shutter on the basis of the release time.

According to a preferred embodiment of the present invention, there is disclosed an image pickup apparatus which generates a warning signal when the amount (integrated value) of change in position is larger than a predetermined value and when the time duration, from when the release switch is turned on until the release time, is longer than a predetermined time duration.

Other objects and features of the present invention will become apparent from the following specification and the accompanying drawings.

DETAILED DESCRIPTION OF THE PREFERRED EMBODIMENTS

The preferred embodiments of an image pickup apparatus according to the present invention will be described in detail hereinafter with reference to the accompanying drawings.

Figure 1:
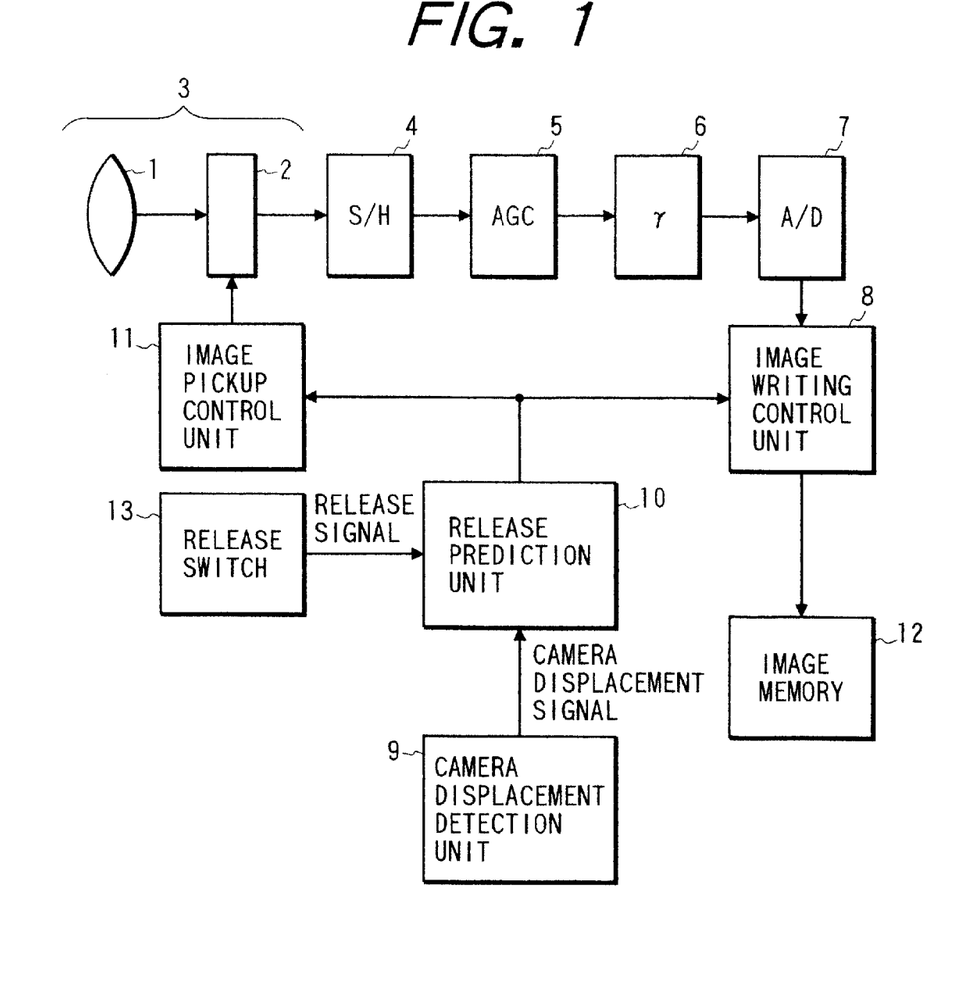
FIG. 1 is a block diagram showing an electronic still camera as an embodiment of an image pickup apparatus according to the present invention.

FIG. 1 is a block diagram showing the arrangement of an electronic still camera as an embodiment (first embodiment) of an image pickup apparatus according to the present invention.

Referring to FIG. 1, an image pickup lens 1 picks up an optical image as an object, and an image sensor 2 such as a CCD serves as an image pickup element for converting the optical image picked up by the image pickup lens 1 into an electrical signal. The image pickup lens 1 and the image sensor 2 constitute an image pickup means 3. The image sensor 2 is arranged at a position where the center of its detection image region substantially crosses the optical axis of the image pickup lens 1, and the detection surface of the image sensor 2 is adjusted to be substantially perpendicular to the optical axis of the image pickup lens 1.

The electrical signal output from the image sensor 2 is supplied to a sample/hold (S/H) circuit 4 to hold the image signal. Then, the image signal is input to an automatic gain control (AGC) circuit 5. The AGC circuit 5 automatically controls the gain of the image signal. The image signal whose gain is controlled by the AGC circuit 5 is input to a γ correction circuit 6 to be subjected to gradation correction. The output signal (analog signal) from the γ correction circuit 6 is converted into a digital signal by an A/D converter 7, and the digital signal is input to an image writing control unit 8.

On the other hand, a camera displacement detection unit 9 comprises an angular velocity sensor such as a vibration gyro. The unit 9 detects the displacement of the position of the image pickup means 3, and outputs the detection result as a camera displacement signal to a release prediction unit 10.

The release prediction unit 10 predicts the image pickup timing on the basis of the camera displacement signal, and outputs an image pickup signal to an image pickup control unit 11 and the image writing control unit 8. The image pickup control unit 11 outputs an image pickup start signal to the image sensor 2 when it receives the image pickup signal from the release prediction unit 10. On the other hand, the image writing control unit 8 writes image information sent from the A/D converter 7 in an image memory 12 when it receives the image pickup signal from the release prediction unit 10. A release switch 13 outputs a release signal to the release prediction unit 10 when it is depressed.

Figure 2:
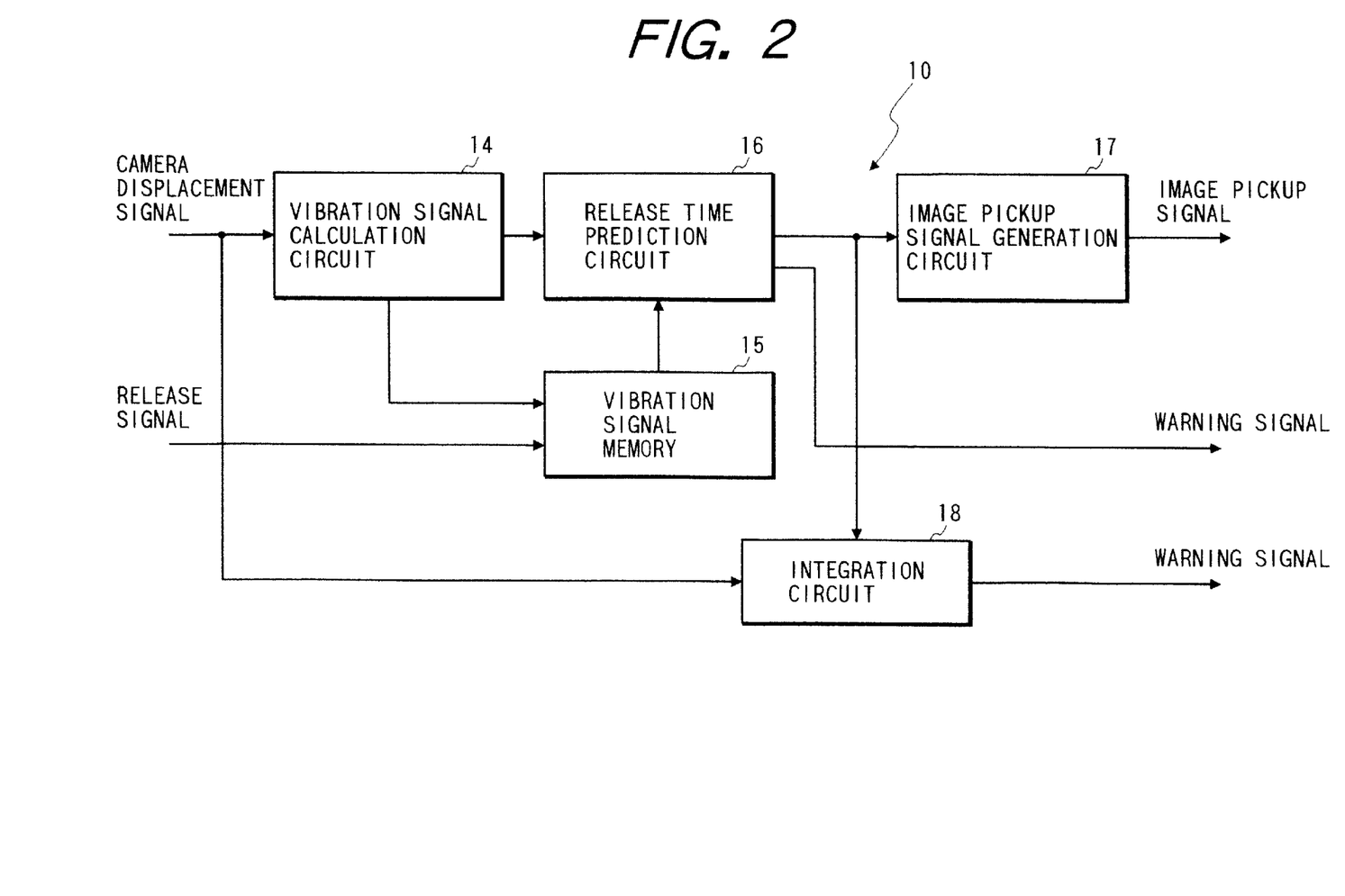
FIG. 2 is a block diagram showing in detail a release prediction unit.

More specifically, as shown in FIG. 2, the release prediction unit 10 comprises a vibration signal calculation circuit 14 for calculating a vibration signal Ω representing the relative magnitude of the position displacement of the image pickup means 3 on the basis of the camera displacement signal, a vibration signal memory 15 for storing the vibration signal Ω for a first predetermined time period Δt after the release signal from the release switch 13 is received, a release time prediction circuit 16 for predicting a release time tr on the basis of the storage result in the vibration signal memory, an image pickup signal generation circuit 17 for generating an image pickup signal on the basis of the prediction result of the release time prediction circuit 16 after an elapse of a second predetermined time period TP from the release time tr, and an integration circuit 18 for calculating an integrated value (change amount) of the change in position by integrating the vibration signal Ω during an interval between an ON time ts of the release switch 13 and the release time tr.

In the electronic still camera with the above-mentioned arrangement, when the power switch (not shown) of the camera is turned on, the camera displacement detection unit 9 always detects the position displacement of the image pickup means 3, and inputs the camera displacement signal to the vibration signal calculation circuit 14 of the release prediction unit 10. Then, the circuit 14 calculates a vibration signal Ω based on equation (1) below:

$$\Omega = \sqrt{\omega_1^2 + \omega_2^2 + \omega_3^2} \qquad (1)$$

where $\omega_1$ is the output signal from the camera displacement detection unit 9, which signal represents the angular velocity of the image pickup lens 1 about the optical axis, and $\omega_2$ and $\omega_3$ are the output signals from the camera displacement detection unit 9, which signals represent angular velocities of the image sensor 2 about the horizontal and vertical axes.

When a photographer depresses the release switch 13, the vibration signal memory 15 of the release prediction unit 10 receives the release signal, and predicts the vibration signal Ω. More specifically, the vibration signal memory 15 receives and stores the vibration signal Ω from the vibration signal calculation circuit 14 for the first predetermined time period Δt, and thereafter, the release time prediction circuit 16 predicts the release time tr by extrapolation on the basis of a change in vibration signal Ω during the first predetermined time period Δt.

Figure 3:
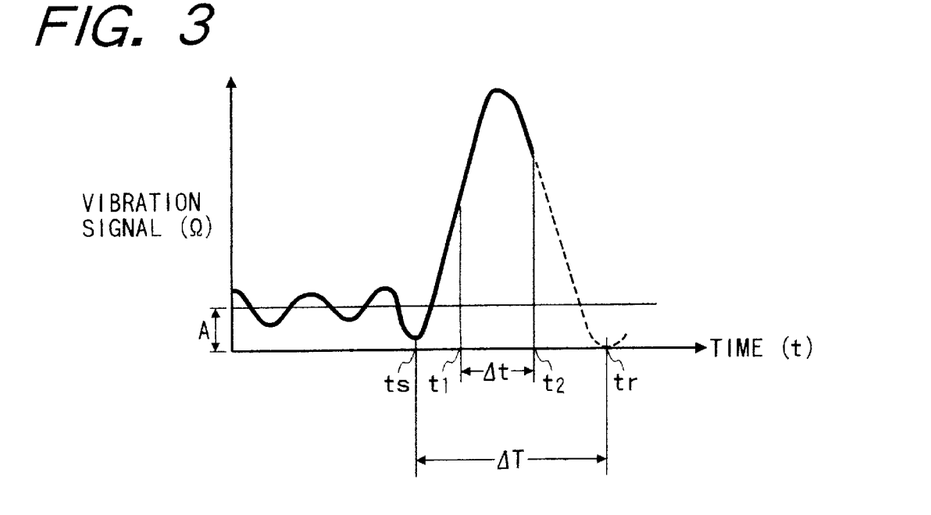
FIG. 3 is a graph showing changes in vibration signal over time.

FIG. 3 is a graph showing the method of predicting the release time tr. In FIG. 3, time (t) is plotted along the abscissa, and the vibration signal (Ω) is plotted along the ordinate. Also, ts represents the ON time of the release switch 13, and A represents the allowable range (predetermined allowable range) of the vibration signal as a vibration amount representing the position displacement of the image pickup means 3.

As shown in FIG. 3, the vibration signal Ω has a characteristic in that it abruptly increases immediately after the ON time ts of the release switch 13, but attenuates after an elapse of a predetermined period of time. In view of this characteristic, in this embodiment, on the basis of the vibration signal Ω obtained during the first predetermined time period Δt from a time $t_1$ after an elapse of the predetermined period of time from the ON time ts of the release switch 13 until a time $t_2$ at which the vibration signal Ω begins to attenuate, a time at which the vibration signal Ω assumes a minimum value after it falls within the predetermined allowable range A is determined to be the release time tr, and the release time tr is predicted by extrapolation processing.

The prediction method of the release time tr will be explained in detail below.

Figure 4A:
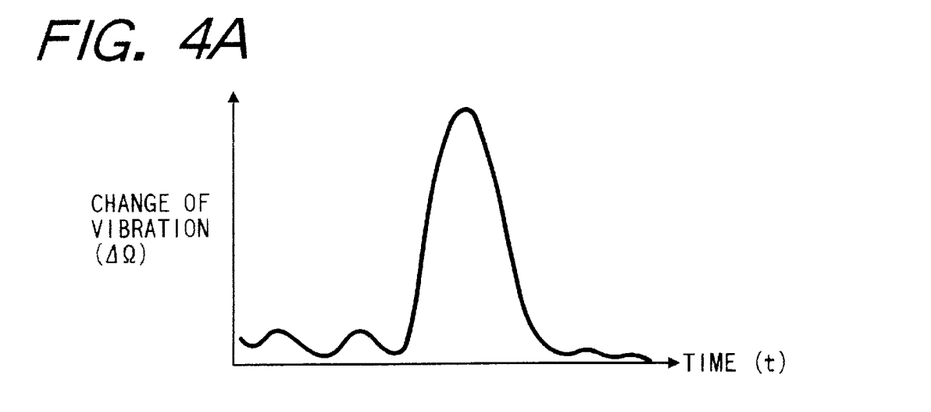
FIGS. 4A and 4B are graphs showing changes in vibration.
Figure 4B:
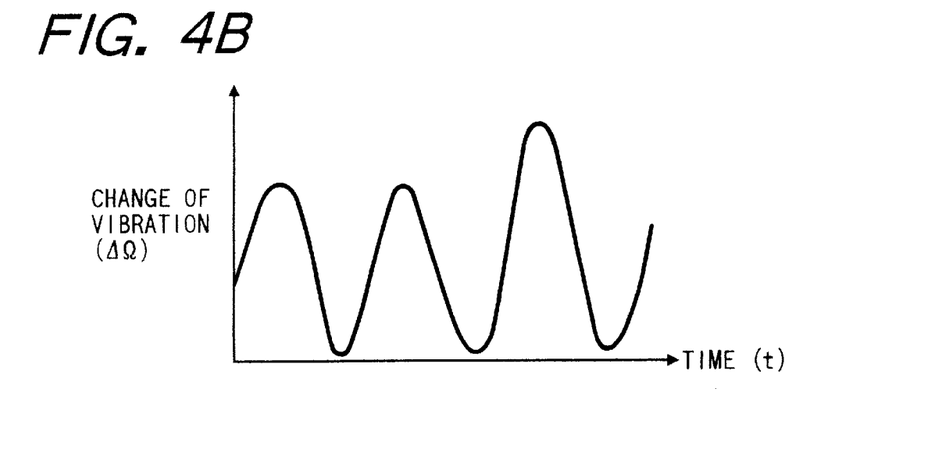

As for the change in position of the image pickup means 3 due to a vibration, there are two different characteristics, as shown in FIGS. 4A and 4B. In FIGS. 4A and 4B, time (t) is plotted along the abscissa, and changes in vibration (ΔΩ) are plotted along the ordinate.

FIG. 4A shows a case wherein a large vibration is generated at the instance when the release button 13 is depressed, and thereafter, the vibration attenuates abruptly. In this case, the release time tr is predicted by extrapolation by means of approximation using a simple polynomial such as a quadratic formula (first prediction method).

FIG. 4B shows a case wherein a photographer performs a photographing operation on a vehicle such as an automobile which is vibrating. In this case, since the vibration signal Ω is considered to have a given dominant frequency, the release time tr is predicted by extrapolation by means of approximation using a periodic function such as a trigonometric function (second prediction method).

As a means for selectively using these two different prediction methods of the release time tr, an external switch is preferably added, and is switched as needed so that the first prediction method is normally selected, and the second prediction method is selected when the camera is used on a vehicle or the like.

After the release time prediction circuit 16 predicts the release time tr, the image pickup signal generation circuit 17 generates an image pickup signal on the basis of the output from the release time prediction circuit 16 after an elapse of the second predetermined time period TP, and outputs the signal to the image writing control unit 8 and the image pickup control unit 11. In this case, when a third predetermined time period ΔT between the ON time ts of the release switch 13 to the release time tr is longer than a fourth predetermined time period TQ, the release time prediction circuit 16 determines that there is an error that cannot be ignored between the predicted release time tr and the actual image signal pickup time, and generates a warning signal, thus informing the photographer who is looking into the finder of this fact. The integration circuit 18 calculates angular displacements $\Delta\omega_1$, $\Delta\omega_2$, and $\Delta\omega_3$ by respectively integrating the above-mentioned angular velocities $\Omega_1$, $\omega_2$, and $\omega_3$ during the third predetermined time period ΔT . When these angular displacements $\Delta\omega_1$, $\Delta\omega_2$, and $\Delta\omega_3$ are larger than a predetermined displacement Δω, the integration circuit 18 determines that the change in position of the image pickup means 3 is large and a vibration may be generated, and generates a warning signal, thus informing the photographer who is looking into the finder of this fact.

Upon reception of the image pickup signal, the image pickup control unit 11 outputs an image pickup start signal to the image sensor 2. Then, the image sensor 2 receives an optical image picked up by the image pickup lens 1 as an electrical signal, and the S/H circuit 4 holds the electrical signal from the image sensor 2 and outputs it as an image signal. The AGC circuit 5 controls the gain of the electrical signal, and the γ correction circuit 6 performs gradation correction of the electrical signal. Thereafter, the A/D converter 7 outputs digital image information. Upon reception of the image pickup signal from the release prediction unit 10, the image writing control unit 8 performs control for writing the digital image information in the image memory 12.

As described above, digital image information with a relatively small vibration amount can be obtained, and when the composition that the photographer intended is different from that to be actually photographed, a warning signal is output to inform the photographer of it.

Figure 5:
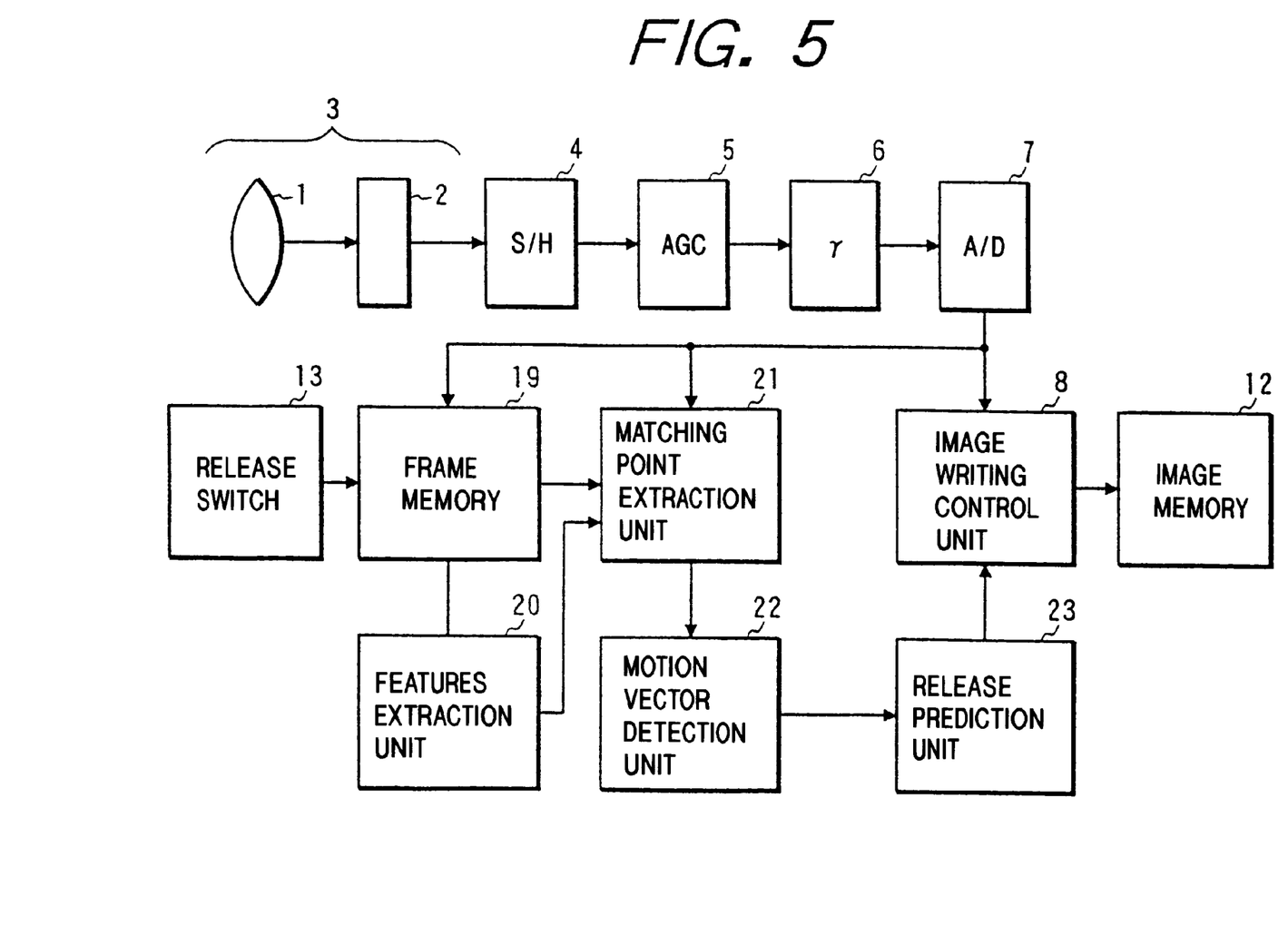
FIG. 5 is a block diagram showing the second embodiment.

FIG. 5 is a block diagram showing an electronic still camera as the second embodiment of an image pickup apparatus according to the present invention. The electronic still camera comprises a frame memory 19 for temporarily storing digital image information for one frame from an A/D converter 7, a features extraction unit 20 for extracting a peak position as a feature coordinate position by differentiating digital image information stored in the frame memory 19, a matching point extraction unit 21 for performing matching at the feature coordinate position on the basis of the image information from the A/D converter 7 and the image information stored in the frame memory 19, a motion vector detection unit 22 for detecting a difference in coordinate position as a motion vector by performing a predetermined calculation using the extraction result of the matching point extraction unit 21, and a release prediction unit 23 for predicting the release time tr on the basis of the detection result of the motion vector detection unit 22.

Figure 6:
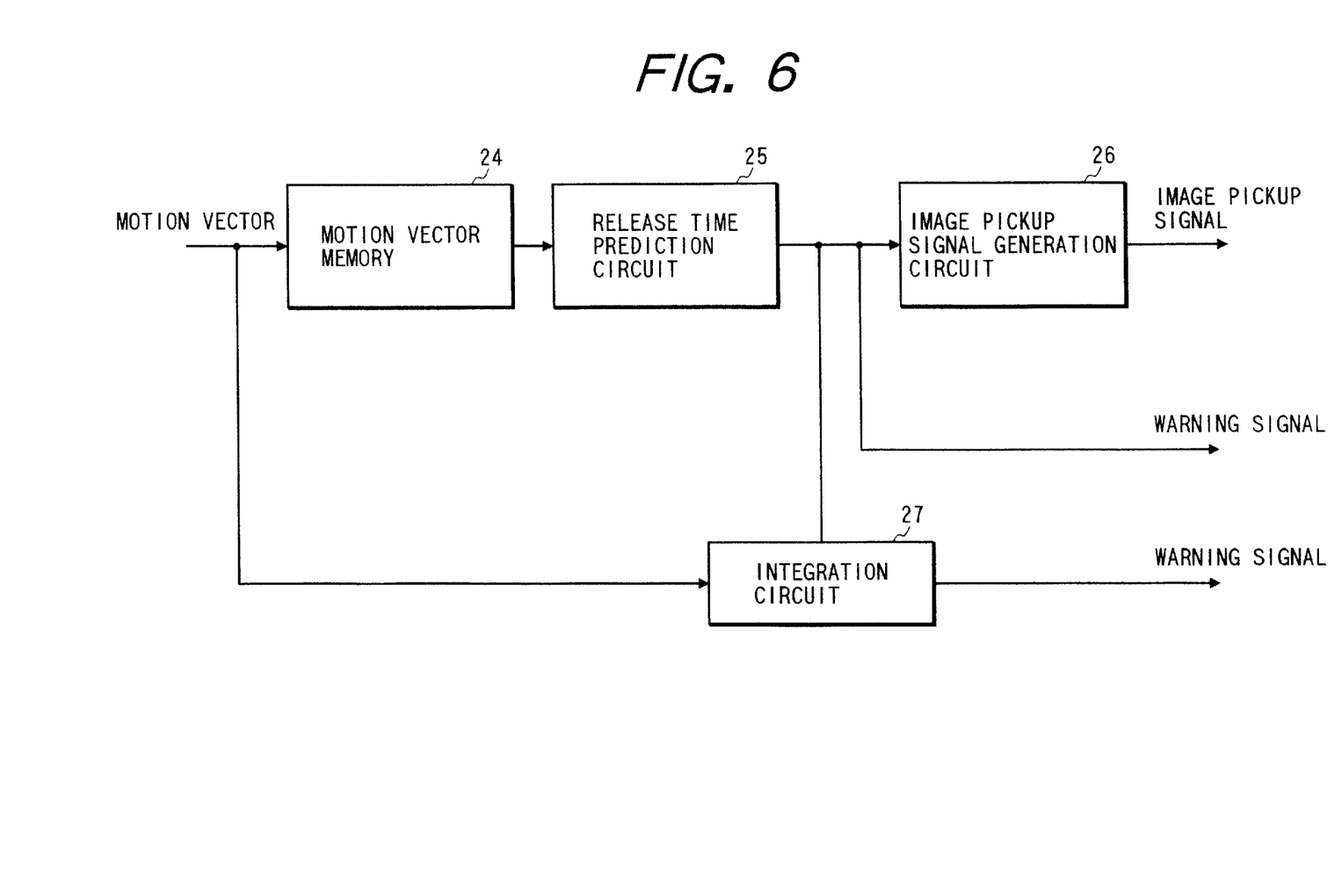
FIG. 6 is a block diagram showing in detail a release prediction unit in the second embodiment.

Furthermore, as shown in FIG. 6, the release prediction unit 23 comprises a motion vector memory 24 for storing the motion vector output from the motion vector detection unit 22, a release time prediction circuit 25 for predicting the release time tr on the basis of the motion vector, an image pickup signal generation circuit 26 for generating an image pickup signal on the basis of the prediction result of the release time prediction circuit 25, and an integration circuit 27 for calculating an integrated value (change amount) of the motion vector by integrating the motion vector displacement from an ON time ts of a release switch 13 to the release time tr.

In the electronic still camera with the above arrangement, when the power switch (not shown) of the camera is turned on, an image sensor 2 receives an optical image picked up by an image pickup lens 1 as an electrical signal, and an S/H circuit 4 holds the electrical signal from the image sensor 2 and outputs it as an image signal. An AGC circuit 5 controls the gain of the image signal, and the image signal is subjected to the gradation correction in a γ correction circuit 6. Thereafter, the A/D converter 7 converts the analog image signal into a digital image signal, and outputs the digital signal.

When a photographer depresses the release switch 13, the frame memory 19 receives a release signal, and temporarily stores digital image information for one frame supplied from the A/D converter 7. The features extraction unit 20 differentiates digital image information stored in the frame memory 19 to extract its peak position as a feature coordinate position. Then, the matching point extraction unit 21 performs matching at the feature coordinate position extracted by the features extraction unit 20 on the basis of image information from the A/D converter 7 and image information stored in the frame memory 19. More specifically, the matching point extraction unit 21 extracts as a template a predetermined small region having the feature coordinate position as the center of the image stored in the frame memory 19, and translates the template by offsetting the position of the template to attain template matching with the image information output from the A/D converter 7, thereby detecting a coordinate position corresponding to the feature coordinate position. The unit 21 repeats the template matching in correspondence with the number of feature coordinate positions, and outputs the detected coordinate positions as matching point pairs. The motion vector detection unit 22 calculates, as motion vectors, coordinate position differences on the basis of the matching point pairs, and outputs one motion vector by averaging motion vector data corresponding to the matching point pairs to the motion vector memory 24 of the release prediction unit 23. The motion vector memory 24 stores the motion vector for a first predetermined time period Δt, and the release time prediction circuit 25 predicts the release time tr by performing extrapolation based on the motion vector information during the first predetermined time period Δt by the same method as in the first embodiment. The image pickup signal generation circuit 26 generates an image pickup signal in accordance with the output from the release time prediction circuit 25 after an elapse of a second predetermined time period TP, and outputs it to an image writing control unit 8. The digital image information supplied from the A/D converter 7 is written in an image memory 12 under the control of the image writing control unit 8 based on the image pickup signal.

As described above, in the second embodiment, digital image information with a relatively small vibration amount can be obtained, and when the composition that the photographer intended is different from that to be actually photographed, a warning signal is output to inform the photographer of it, as in the first embodiment.

The present invention is not limited to the above embodiments. In the above embodiments, the electronic still camera has been exemplified. However, the present invention can be applied to a camera which controls the exposure amount using a shutter and records an object image on a silver halide film.

As described above, according to the above-mentioned embodiments, a photographer can easily pick up an image free from any vibration even using a compact, lightweight image pickup apparatus which easily develops vibration.

When the composition that the photographer intended is different from the composition to be actually photographed, a warning signal is output, thus informing the photographer of it.

Widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus comprising:

image pickup means for converting an optical image picked up into an electrical signal;

image information storage means for storing image information obtained by said image pickup means;

detection means for detecting an amplitude of vibration of the image pickup means;

prediction means for predicting when the amplitude of vibration of the image pickup means falls within a predetermined allowable range, on the basis of a detection result of said detection means; and control means for controlling a start of image pickup operation of said image pickup means on the basis of a prediction result of said prediction means.

2. An image pickup apparatus comprising open/close control means for controlling an open/close state of a shutter on the basis of the prediction result of said prediction means in place of said control means of claim 1.

3. An apparatus according to claim 1, further comprising a release switch for outputting a release signal, and integration means for integrating the vibration during an interval from an ON time of said release switch until the start of image pickup operation, and wherein a warning signal is generated when an integrated value of said integration means is larger than a predetermined value.

4. An apparatus according to claim 1, further comprising a release switch for outputting a release signal, and wherein a warning signal is generated when a time duration from an ON time of said release switch until the start of image pickup operation is longer than a predetermined time duration.

5. An apparatus according to claim 1, wherein said detection means comprises angular velocity detection means for detecting the amplitude of vibration as a change in angular velocity.

6. An apparatus according to claim 1, wherein said prediction means comprises displacement state calculation means for calculating the vibration of the amplitude of vibration on the basis of the detection result of said detection means, amplitude storage means for storing the amplitude of vibration for a predetermined time period, start time prediction means for predicting the start of an image pickup operation on the basis of the amplitude of vibration, and image pickup signal generation means for generating the image pickup signal on the basis of a prediction result of said start time prediction means.

7. An apparatus according to claim 1, wherein said detection means comprises temporary storage means for temporarily storing the image information, feature point extraction means for extracting a peak position as a feature point by differentiating the image information, matching point extraction means for extracting a matching point at the feature point on the basis of a storage result in said temporary storage means and image information picked up by the image pickup means, and motion vector detection means for detecting a motion vector on the basis of an extraction result of said matching point extraction means and the image information picked up by the image pickup means.

8. An apparatus according to claim 7, wherein said prediction means comprises motion vector storage means for storing the motion vector, start time reduction means for predicting the start of an image pickup operation on the basis of the motion vector, and image pickup signal generation means for generating the image pickup signal on the basis of a prediction result of said start time prediction means.

9. An image pickup apparatus according to claim 1, wherein the image information stored in said information storage means is still image information.

10. A recording apparatus comprising:

an image memory;

recording means for writing image information in said image memory;

movement detection means for detecting a vibration; and control means for predicting a timing when the movement becomes less than a predetermined amount on the basis of an output from said movement detection means, and operating said recording means at the predicted timing.

11. A recording apparatus according to claim 10, wherein the image information written into said recording means is still image information.

12. An apparatus according to claim 10, wherein said movement detection means comprises angular velocity detection means for detecting the change in position as a change in angular velocity.

13. An apparatus according to claim 10, wherein said movement detection means comprises temporary storage means for temporarily storing the image information, feature point extraction means for extracting a peak position as a feature point by differentiating the image information, matching point extraction means for extracting a matching point at the feature point on the basis of a storage result in said temporary storage means and image information picked up by the image pickup means, and motion vector detection means for detecting a motion vector on the basis of an extraction result of said matching point extraction means and the image information picked up by the image pickup means.

14. An image pickup apparatus comprising:

image pickup means for converting an optical image picked up into an electrical signal;

image information storage means for storing image information obtained by said image pickup means;

detection means for detecting an amplitude of vibration of the image pickup means;

prediction means for predicting when the amplitude of vibration of the image pickup means falls within a predetermined allowable range, on the basis of a detection result of said detection means; and control means for controlling image pickup operation of said image pickup means on the basis of a prediction result of said prediction means.

* * * * *

UNITED STATES PATENT AND TRADEMARK OFFICE
CERTIFICATE OF CORRECTION

PATENT NO. : 5,905,848
DATED : May 18, 1999
INVENTOR(S) : KOTARO YANO, ET AL.

It is certified that error appears in the above-identified patent and that said Letters Patent is hereby corrected as shown below:

Column 1

Line 18, "operation," should read --operation--, and "occur" should read --occur,--.

Line 35, "signal the apparatus," should read --signal. The apparatus--.

Column 5

Line 13, "$\Omega_1$" should read --$\omega_1,$--.

Signed and Sealed this

Thirtieth Day of November, 1999

Q. TODD DICKINSON

Attest:

Attesting Officer

Acting Commissioner of Patents and Trademarks